US012173250B2

(12) United States Patent
Witt et al.

(10) Patent No.: US 12,173,250 B2
(45) Date of Patent: Dec. 24, 2024

(54) PTFE POLYMER-BASED SLIDING MATERIAL HAVING FILLERS WHICH IMPROVE THE TRIBOLOGICAL PROPERTIES

(71) Applicant: KS Gleitlager GmbH, St. Leon-Rot (DE)

(72) Inventors: Mario Witt, Heidelberg (DE); Rolf Reinicke, Bad Schoenborn (DE); Riitta Taipalus, Limburgerhof (DE)

(73) Assignee: KS GLEITLAGER GMBH, St. Leon-Rot (DE)

( * ) Notice: Subject to any disclaimer, the term of this patent is extended or adjusted under 35 U.S.C. 154(b) by 91 days.

(21) Appl. No.: 16/604,670

(22) PCT Filed: Apr. 12, 2018

(86) PCT No.: PCT/EP2018/059437
§ 371 (c)(1),
(2) Date: Oct. 11, 2019

(87) PCT Pub. No.: WO2018/189318
PCT Pub. Date: Oct. 18, 2018

(65) Prior Publication Data
US 2023/0257676 A1    Aug. 17, 2023

(30) Foreign Application Priority Data
Apr. 12, 2017  (DE) ..................... 10 2017 107 959.9

(51) Int. Cl.
*C10M 169/04*    (2006.01)
*B32B 15/18*    (2006.01)
(Continued)

(52) U.S. Cl.
CPC ........... *C10M 169/04* (2013.01); *B32B 15/18* (2013.01); *C10M 107/38* (2013.01);
(Continued)

(58) Field of Classification Search
CPC .............. C10M 169/04; C10M 107/38; C10M 125/22; C10M 125/24; C10M 2201/084;
(Continued)

(56) References Cited

U.S. PATENT DOCUMENTS

2002/0018605 A1    2/2002  McDonald
2004/0142199 A1    7/2004  Bickle et al.
(Continued)

FOREIGN PATENT DOCUMENTS

CN    105637244 A    6/2016
DE    2857283 C1    12/1980
(Continued)

OTHER PUBLICATIONS

English language translation and Abstract of JP11257356A.
(Continued)

*Primary Examiner* — Prem C Singh
*Assistant Examiner* — Francis C Campanell
(74) *Attorney, Agent, or Firm* — Ware, Fressola, Maguire & Barber LLP

(57) ABSTRACT

The invention relates to a PTFE polymer-based sliding material having fillers which improve the tribological properties, wherein the fillers comprise at least one phosphate, in particular calcium phosphate, calcium pyrophosphate, magnesium phosphate, magnesium pyrophosphate, lithium phosphate, hydroxyapatite or combinations thereof, and at least one metal sulfide, wherein the fraction of the metal sulfide is >2% by volume. The invention also relates to uses of said sliding material.

18 Claims, 3 Drawing Sheets

(51) Int. Cl.

| | |
|---|---|
| *C10M 107/38* | (2006.01) |
| *C10M 125/22* | (2006.01) |
| *C10M 125/24* | (2006.01) |
| *F16C 33/20* | (2006.01) |
| *B32B 5/16* | (2006.01) |
| *B32B 15/16* | (2006.01) |
| *C10N 10/14* | (2006.01) |
| *C10N 10/16* | (2006.01) |
| *C10N 40/02* | (2006.01) |

(52) U.S. Cl.
CPC ........ *C10M 125/22* (2013.01); *C10M 125/24* (2013.01); *F16C 33/205* (2013.01); *B32B 5/16* (2013.01); *B32B 15/16* (2013.01); *B32B 2260/02* (2013.01); *B32B 2260/046* (2013.01); *B32B 2264/105* (2013.01); *B32B 2307/554* (2013.01); *B32B 2307/744* (2013.01); *C10M 2201/084* (2013.01); *C10M 2201/085* (2013.01); *C10M 2213/0623* (2013.01); *C10N 2010/14* (2013.01); *C10N 2010/16* (2013.01); *C10N 2040/02* (2013.01); *F16C 2208/32* (2013.01)

(58) Field of Classification Search
CPC .... C10M 2201/085; C10M 2213/0623; C10M 2201/041; C10M 2201/05; C10M 2201/061; C10M 2201/062; C10M 2201/065; C10M 2201/066; C10M 2201/081; B32B 15/18; B32B 5/16; B32B 15/16; B32B 2260/02; B32B 2260/046; B32B 2264/105; B32B 2307/554; B32B 2307/744; B32B 2262/0269; B32B 2264/0214; B32B 2264/025; F16C 33/205; F16C 2208/32; C10N 2040/02; C08K 2003/3009; C08K 2003/321; C08K 2201/014

USPC ........................................................ 508/104
See application file for complete search history.

(56) References Cited

U.S. PATENT DOCUMENTS

| | | | | |
|---|---|---|---|---|
| 2007/0269674 | A1* | 11/2007 | Yanase | ................. F16C 33/201 428/550 |
| 2011/0082059 | A1* | 4/2011 | Iwata | .................. C10M 169/04 508/168 |
| 2011/0148064 | A1* | 6/2011 | Yanase | ............... C10M 169/044 428/550 |
| 2018/0118251 | A1 | 5/2018 | Maeda | |

FOREIGN PATENT DOCUMENTS

| | | |
|---|---|---|
| DE | 69727066 T2 | 7/2004 |
| EP | 1132634 B1 | 12/2005 |
| EP | 1839846 A1 | 10/2007 |
| EP | 2677021 A1 | 12/2013 |
| EP | 3287651 A1 | 2/2018 |
| GB | 2319067 A | 5/1998 |
| JP | 11257356 A | 9/1999 |
| JP | 2004270760 A | 9/2004 |
| WO | 02099298 A1 | 12/2002 |
| WO | 2016170742 A1 | 10/2016 |

OTHER PUBLICATIONS

English language abstract of WO02099298.
English language abstract of WO2016170742.
English language Abstract of JP2004270760A.
English language Abstract of CN105637244A.
English language Abstract of DE2857283 not available.
English language Abstract for DE69727066 (T2) not available.
English language Abstract of corresponding document GB2319067 (A).

\* cited by examiner

PTFE POLYMER-BASED SLIDING MATERIAL HAVING FILLERS WHICH IMPROVE THE TRIBOLOGICAL PROPERTIES

The invention relates to a PTFE polymer-based sliding material having fillers which improve the tribological properties.

In the prior art, a variety of sliding materials are known, which are, for example, PTFE-based and use a variety of fillers.

For example, DE 10 2011 077 008 A1 describes a PTFE-based sliding bearing composite material, wherein fillers comprising thermoplastics and/or thermosets and further tribologically active substances are present together in compounded form in the polymer base of the sliding layer material.

Furthermore, EP 2 563 590 B1 describes a fluoropolymer-based sliding bearing material, for example PTFE-based, wherein 5-25% by volume boron nitride and 1-15% by volume mixed phase oxide pigments are added to the fluoropolymer, which is intended to improve wear resistance.

EP 2 316 707 A1 and EP 1 647 574 A1 describe a PTFE-based sliding bearing material with barium sulfate, phosphate and an amount of 0.1 to 2% of metal sulfide.

Finally, WO 2016/170742 A1 discloses a material based on PTFE and 10-40% phosphates.

Despite the variety of sliding materials described in the prior art, there remains a need for a sliding material that is wear-resistant and suitable for both dry-running and lubricated rotational and axial applications.

It is an object of the invention to improve the tribological properties and, in particular, at the same time the wear resistance of PTFE polymer-based sliding materials in the various applications.

This problem is solved by a PTFE polymer-based sliding material having the features of claim 1. Advantageous developments are described in claims 2 to 12.

In addition, the invention relates to a PTFE-based sliding bearing composite material according to claim 13 and a sliding bearing element according to claim 14.

It has surprisingly been found that the wear resistance of the sliding material is significantly improved by the addition of at least one phosphate together with at least more than 2% by volume of metal sulfide, being used as the phosphate in particular a calcium phosphate, calcium pyrophosphate, magnesium phosphate, magnesium pyrophosphate, lithium phosphate, hydroxyapatite or combinations thereof, as fillers for the PTFE polymer base. This can already be achieved without the addition of further fillers. Particularly preferred is the use of a calcium phosphate. As calcium phosphate, for example, pentacalcium phosphate, pentacalcium hydroxy orthophosphate (hydroxyapatite), tricalcium bis (orthophosphate), dicalcium pyrophosphate or calcium hydrogen orthophosphate can be used.

Particularly advantageous properties result when the proportion of phosphates in total is 1 to 30% by volume, in particular 1 to 25% by volume and in particular 1 to 20% by volume of the sliding material. Particular preference is given to proportions of between 10 and 15% by volume.

Particularly advantageous properties result when the proportion of phosphates in total is 1 to 30% by volume, in particular 1 to 25% by volume and in particular 1 to 20% by volume of the sliding material. Particular preference is given to proportions of between 10 and 15% by volume. The proportion is at least 1% by volume, preferably at least 3% by volume, preferably at least 5% by volume, more preferably at least 10% by volume, more preferably at least 12% by volume and more preferably at least 15% by volume. More preferably, the proportion is at most 30% by volume, more preferably at most 25% by volume, further preferably at most 20% by volume, and finally more preferably at most 15% by volume.

For this purpose, the sliding material contains in addition to the phosphate one or more metal sulfides in a proportion of more than 2% by volume, preferably more than 3% by volume and more preferably more than 5% by volume, preferably more than 7% by volume and more preferably more than 9% by volume, and more preferably 10% by volume or more than 10% by volume. More preferably, the proportion of metal sulfide is at most 30% by volume, preferably at most 20% by volume and more preferably at most 15% by volume.

In addition to the phosphate used, the metal sulfide used with a proportion of more than 2% by volume further improves the tribological properties. As metal sulfides, preferably at least one of the group $SnS_2$, $MoS_2$, $Bi_2S_3$, $WS_2$, ZnS and/or CuS and combinations are used.

The sliding material according to the invention is preferably lead-free.

The present sliding material is suitable in particular for uses outside the motor in the automotive sector, in particular in common rail pumps, shock absorbers, gearboxes and steering systems, in particular in rotational and axial applications. In such applications, there is a desire to use lead-free sliding materials. The present sliding material now provides a material which has improved wear resistance, in particular with equal or even improved friction behavior.

In the sliding material according to the invention, a PTFE base is used as the polymer base for the polymer matrix. This does not necessarily mean that the entire polymer base must be made of PTFE. Proportions of up to 30% by volume of the polymer fraction, in particular up to 20% by volume and preferably only up to 10% by volume, of the PTFE polymer base may be replaced by other polymers and combinations thereof, in particular PVDF, PFA, FEP, ECTFE, ETFE. Preferably, the entire PTFE polymer base consists of up to 100% by volume of PTFE.

The ratio of the volumes of phosphate to metal sulfide is preferably 6:1 to 1:2, more preferably 4:1 to 1:1.

In particular, one or more phosphates, for example calcium phosphate, may also be combined with two or more metal sulfides.

The volume fractions are determined by means of weight and density.

The sliding material may preferably comprise further secondary fillers, in particular further solid lubricants, in particular $BaSO_4$, lithophones and/or fluorides, especially calcium fluoride, and/or pigments and combinations of the aforementioned secondary fillers. As a result, the wear properties are further improved.

In addition, other tertiary fillers, in particular carbon fibers, glass fibers, polymer fibers (in particular aramid fibers); and/or solid lubricants, in particular graphite, carbon black, BN and/or plastic particles, such as PFPE, aramid (PPTA), $PPSO_2$, PI and PAI particles, polyacrylate particles (PAR), PBA particles, PBI particles; and/or metal oxides, in particular $Fe_2O_3$, $Al_2O_3$, $SiO_2$, $CrO_2$, $TiO_2$, CuO, MgO, ZnO; and/or hard material particles, in particular ceramic particles, such as SiC, $Si_3N_4$, BC, cubic BN; and/or fluorides, such as in particular NaF, $AlF_3$; and/or sheet silicates, in particular kaolin, mica, wollastonite, talc, silicic acid; and/or metallic fine powders, in particular bronze and bismuth; and/or pigments or mixed phase oxide pigments, in particular Co—Al, Cr—Sb—Ti, Co—Ti, Fe—Al, Mn—Fe or Co—Cr may be contained in the sliding material.

In this case, the proportion of secondary fillers is preferably 0 to 30% by volume, in particular 1 to 20% by volume and in particular 1 to 10% by volume of the sliding material. The proportion of tertiary fillers in the sliding material may be 0 to 10% by volume of the sliding material.

Furthermore, it is particularly preferred that the PTFE polymer base constitutes 50 to 95% by volume, in particular 60 to 95% by volume and in particular 70 to 90% by volume of the sliding material. In this way, the properties of the PTFE material can affect the sliding material in a sufficient manner.

The sliding material can serve for producing a sliding bearing composite material with a metallic support layer, in particular made of steel or bronze, optionally with a porous support layer, in particular made of sintered bronze and with a sliding material filling the pores of the support layer or bearing layer of the type described above. For this purpose, the PTFE based sliding material having the fillers is preferably in paste form. The pasty sliding material is then applied to the porous layer and impregnated into the pores via a rolling process and then sintered.

The sliding bearing composite material can be used as a sliding bearing element, wherein a sliding bearing element can be, for example, a sliding strip, a sliding block, a sliding pad and a plain bearing shell, a slide bearing bush or a slide bearing collar bush.

Sliding elements may typically also be rolled cylindrical bushes or half-shell sliding bearing elements made with the sliding bearing composite. The sliding bearing composite material can also be used for the production of flanged bushes or cup bushes or planar and spherical sliding bearing elements.

Below are listed several examples and references.

| Example | Fillers | Polymer matrix |
| --- | --- | --- |
| (Comparison) 1 | 20% by volume of ZnS | PTFE (remainder) |
| (Reference) 2 | 20% by volume of calcium phosphate | PTFE ( remainder ) |
| (Comparison) 3 | 20 by volume of $Bi_2S_3$ | PTFE (remainder) |
| (Comparison) 4 | 20% by volume of $SnS_2$ | PTFE (remainder) |
| (Comparison) 5 | 20% by volume of $WS_2$ | PTFE (remainder) |
| 6 | 15% by volume of calcium phosphate 10% by volume of $Bi_2S_3$ | PTFE (remainder) |
| 7 | 15% by volume of calcium phosphate 10% by volume of $SnS_2$ | PTFE (remainder) |
| 8 | 15% by volume of calcium phosphate 10% by volume of $WS_2$ | PTFE (remainder) |
| 9 | 10% by volume of calcium phosphate 10% by volume of $Bi_2S_3$ 10% by volume of $BaSO_4$ | PTFE (remainder) |

The calcium phosphate used in the examples is in all cases tricalcium phosphate $Ca_3(PO_4)_2$.

Figure 1:
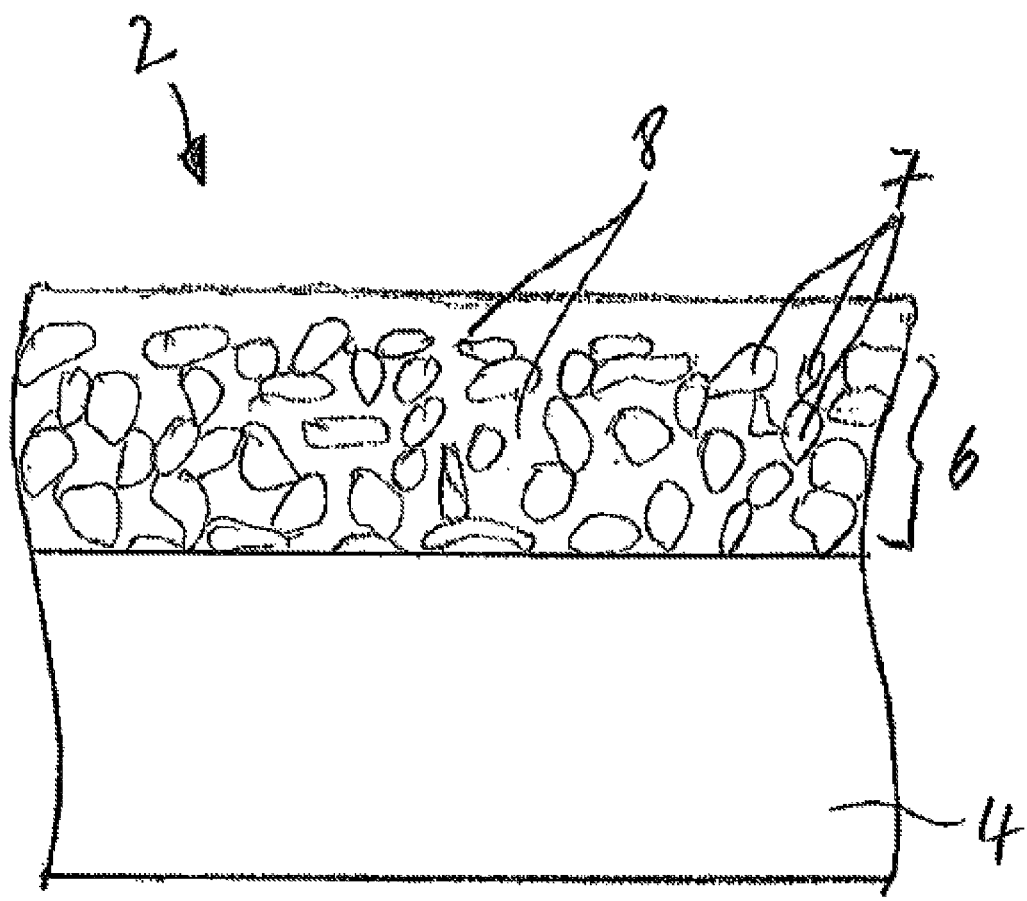
FIG. 1 shows a schematic sectional view of a metal/plastic sliding bearing composite material according to the invention.

FIG. 1 shows a schematic sectional view of a sliding bearing composite material 2 according to the invention with a metallic support layer 4, typically of steel, and with a porous carrier layer 6. The porous carrier layer 6 is formed by a sintered layer of bronze-based metallic particles 7. The particles of the carrier layer 6 form coherent macroscopic cavities (which are not shown to scale), in which a polymer-based sliding material 8 according to the invention is impregnated. The sliding material 8 fills the pores of the support layer 6 substantially completely. The matrix-forming polymer component of the sliding layer material 8 is based on PTFE in the sense defined above. The polymer component is advantageously made of PTFE. The sliding layer material 8 further comprises fillers incorporated in the matrix-forming polymer component, namely one or more phosphates and one or more metal sulfides. Other fillers in addition to phosphates and metal sulfides may prove to be advantageous and are also not shown. In particular, the above-mentioned secondary and/or tertiary fillers are suitable.

Figure 2:
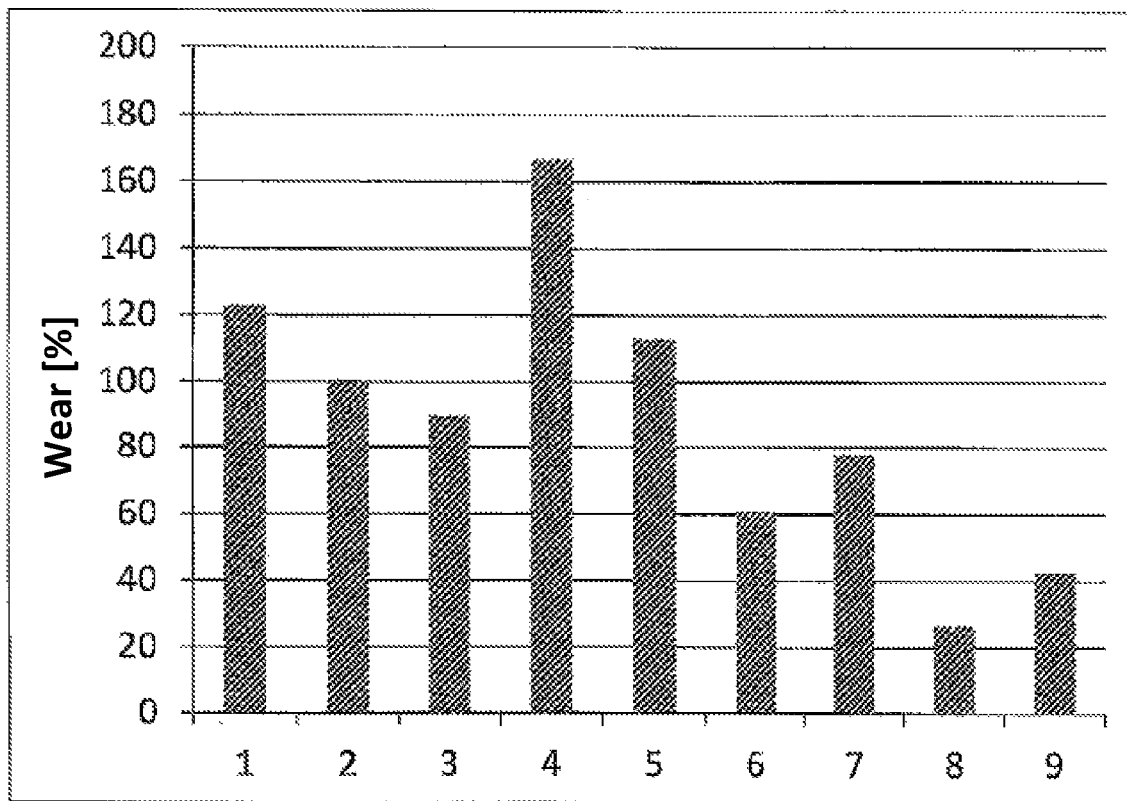
FIG. 2 shows measurement results of wear values of sliding bearing members made of the above sliding materials.
Figure 3:
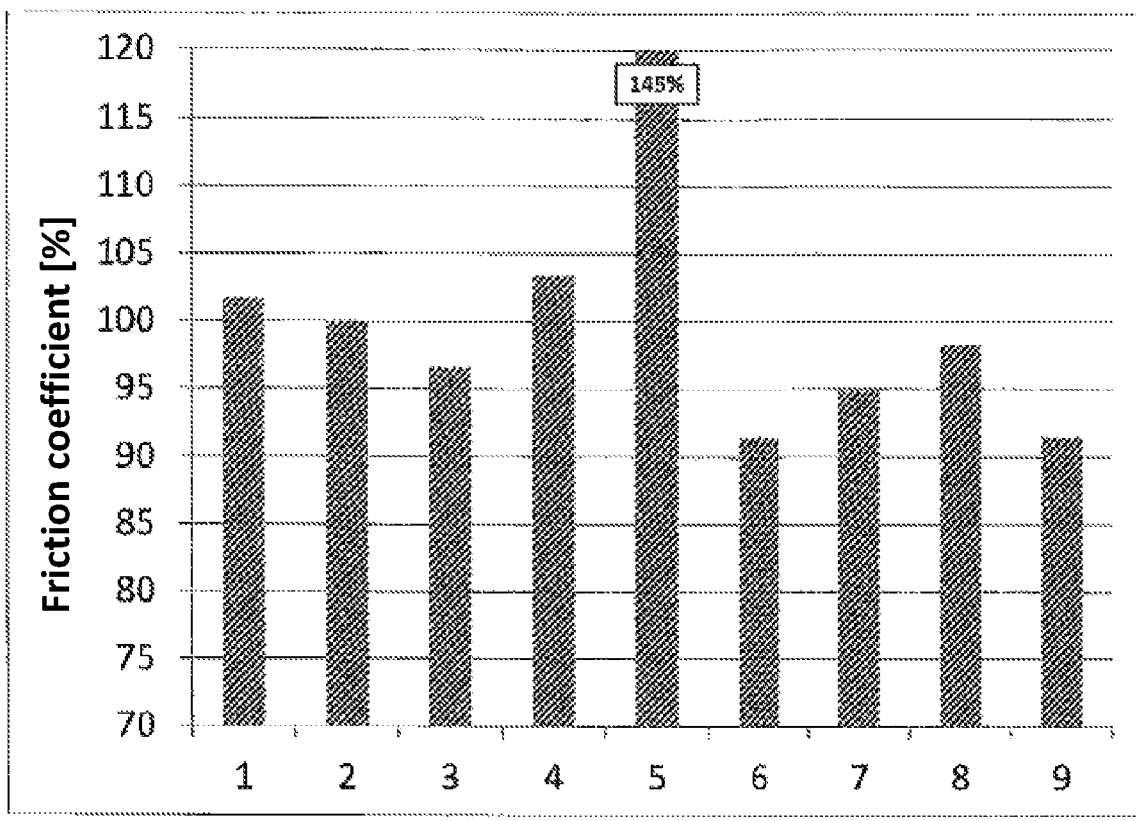
FIG. 3 shows measurement results of friction coefficients of sliding bearing members made of the above sliding materials.

FIG. 2 shows the result of wear measurements and FIG. 3 of friction coefficient measurements on sliding bearing elements, which were measured with sliding bearing composite materials using sliding materials of the above examples 1 to 9. The sliding bearing composites comprise a metallic support layer of steel, a porous support layer of the type described above, and a polymer-based sliding material filling the pores of the support layer. The examined sliding bearing elements differ only with regard to the composition of the sliding material.

The wear resistance and friction coefficients were determined in a rotation test with a sliding speed of 2 m/s under a load of 0.75 MPa. The test parameters are given in the table below.

| Test parameters | Test parameters |
| --- | --- |
| Lubrication condition | Dry run |
| Counter body | 100Cr6 |
| Load | 0.75 MPA |
| Sliding speed | 2 m/s |
| Test time | 15 h |

For this purpose, a bush was produced as a sliding bearing element having an inner diameter of 20 mm and an outer diameter of 23 mm and 15 mm width, comprising the sliding material according to the above examples 1 to 9.

Example 2, which contains only calcium phosphate as a filler, serves as reference example, to the measured values of which the other examples are related. Examples 1 and 3 to 5 are not comparative examples according to the invention. Examples 6 to 9 show sliding materials according to the invention.

The sliding materials to which calcium phosphate and a metal sulfide have been added as fillers and which thus correspond to the invention show a significantly and surprisingly lower wear than the comparative examples and the reference example.

The wear resistance can be further improved by targeted combinations of calcium phosphate with metal sulfides as further solid lubricants (primary fillers), such as $Bi_2S_3$ (Example 6), $SnS_2$ (Example 7) or $WS_2$ (Example 8). Furthermore, a mixture of phosphate and primary fillers (here $Bi_2S_3$) and secondary fillers, here $BaSO_4$ as a solid lubricant, were investigated, which further improves the wear values (s. Example 9). Especially the examples 8 and 9 show a more than 50% lower wear than the references with consistently good friction coefficients.

The invention claimed is:

1. Polytetrafluoroethylene (PTFE) polymer-based sliding material having fillers for improving tribological properties, characterised in that
   the fillers comprise a primary filler having calcium phosphate and at least one metal sulphide;
   the at least one metal sulphide is at least >2% by volume;
   contents of the fillers by volume are determined by weight and density;
   the at least one metal sulphide comprises Tin(IV) sulphide ($SnS_2$), Bismuth (III) sulfide ($Bi_2S_3$), Tungsten disulfide ($WS_2$), Zinc sulfide (ZnS), Copper (II) sulfide (CuS) or a combination thereof;
   the PTFE polymer-based sliding material having a PTFE polymer-base that comprises at least 70% by volume of PTFE; and
   the PTFE polymer-based sliding material comprises secondary fillers having solid lubricants with Barium sulfate ($BaSO_4$).

2. The PTFE polymer-based sliding material according to claim 1, characterised in that
   the PTFE polymer-base comprises at least 80% by volume of PTFE;
   the contents of the fillers comprise up to 30% by volume of the PTFE polymer-base; and
   the PTFE polymer base includes up to 10% by volume of other polymers or combinations thereof, including polyvinylidene (PVDF), polyfluoroalkyl (PFA), fluorinated ethelene propylene (FEP), ethylene chlorotrifluoroethylene (ECTFE), or ethylene tetrafluoroethylene (ETTE).

3. The PTFE polymer-based sliding material according to claim 1, characterised in that an amount of the calcium phosphate in the PTFE polymer-based sliding material is in a range of 1-30% by volume.

4. The PTFE polymer-based sliding material according to claim 1, characterised in that an amount of the metal sulphide as fillers is more than 3% by volume, or is at most between 10-30% by volume of the PTFE polymer-based sliding material.

5. The PTFE polymer-based sliding material according to claim 1, characterised in that a ratio of the volume of the calcium phosphate to the at least one metal sulphide is in a range of 6:1 to 1:2.

6. The PTFE polymer-based sliding material according to claim 1, characterised in that the secondary fillers include lithophones, or fluorides, or both lithophones and fluorides, and the fluorides include calcium fluoride, or pigments, or both calcium fluoride and pigments.

7. The PTFE polymer-based sliding material according to claim 1, characterised in that
   the PTFE polymer-based sliding material comprises further tertiary fillers that include carbon fibres, glass fibres, polymer fibres including aramid fibres, and/or the solid lubricants include graphite, soot, boron nitride (BN) and/or plastic particles;
   the plastic particles include perfluoropolyether (PFPE), aramid (PPTA), polypropylene sulfur dioxide ($PPSO_2$), phosphorus triiodide phosphorus (III) iodine (PI) and polyamide-imide (PAI) particles, polyacrylate particles (PAR), bisphenol A (PBA) particles, polybenzimidazole (PBI) particles; and/or metal oxides, including ferric oxide ($Fe_2O_3$), aluminium oxide ($Al_2O_3$) Silicon dioxide ($SiO_2$) Chromium dioxide ($CrO_2$) titanium dioxide ($TiO_2$), copper oxide (CuO), magnesium oxide (MgO), zinc oxide (ZnO), and/or hard material particles; and
   the hard material particles include ceramic particles comprising silicon carbon (SiC), silicon nitride ($Si_3N_4$), boron carbide (BC), cubic boron nitride (BN); and/or fluorides, including sodium fluoride (NaF), aluminium fluoride ($AlF_3$) and/or layered silicates, including kaolin, mica, wollastonite, talc, silica; and/or metallic fine powders, and the metallic fine powders include bronze and bismuth, and/or pigments or mixed phase oxide pigments, including cobalt aluminate (Co—Al), chrome antimony titanium (Cr—Sb—Ti), cobalt titanate (Co—Ti), iron alumina (Fe—Al), manganese ferrite (Mn—Fe) or cobalt chromite (Co—Cr).

8. The PTFE polymer-based sliding material according to claim 1, characterised in that the PTFE polymer-base is in a range of 50-95% by volume of the PTFE polymer-based sliding material.

9. A plain bearing composite material having a metallic support layer, including steel or bronze; having a porous backing layer, including bronze; and having the PTFE polymer-based sliding material according to claim 1 filling pores of the porous backing layer.

10. A plain bearing element manufactured from the plain bearing composite material according to claim 9.

11. The plain bearing element according to claim 10, characterised in that the plain bearing element is a sliding rail, or a sliding shoe, or a sliding pad, or a plain bearing shell, or a plain bearing bushing, or a plain bearing collar bushing.

12. The PTFE polymer-based sliding material according to claim 2, characterised in that an amount of the calcium phosphate in the PTFE polymer-based sliding material is in a range of 1-30% by volume.

13. The PTFE polymer-based sliding material according to claim 2, characterised in that an amount of the metal sulphide as fillers is more than 3% by volume, or is at most 30% by volume of the PTFE polymer-based sliding material.

14. The PTFE polymer-based sliding material according to claim 2, characterised in that a ratio of the volume of the calcium phosphate to the at least one metal sulphide is in a range of 6:1 to 1:2.

15. The PTFE polymer-based sliding material according to claim 2, characterised in that the secondary fillers include lithophones, or fluorides, or both lithophones and fluorides, and the fluorides includes calcium fluoride, or pigments, or both calcium fluoride and pigments.

16. The PTFE polymer-based sliding material according to claim 2, characterised in that
   the PTFE polymer-based sliding material contains further tertiary fillers that include carbon fibres, glass fibres, polymer fibres including aramid fibres, and/or the solid lubricants include graphite, soot, boron nitride (BN) and/or plastic particles;
   the plastic particles include perfluoropolyether (PFPE), aramid (PPTA), polypropylene sulfur dioxide ($PPSO_2$), phosphorus triiodide phosphorus (III) iodine (PI) and polyamide-imide (PAI) particles, polyacrylate particles (PAR), bisphenol A (PBA) particles, polybenzimidazole (PBI) particles; and/or metal oxides, including ferric oxide ($Fe_2O_3$), aluminium oxide ($Al_2O_3$) Silicon dioxide ($SiO_2$) Chromium dioxide ($CrO_2$) titanium dioxide ($TiO_2$), copper oxide (CuO), magnesium oxide (MgO), zinc oxide (ZnO), and/or hard material particles; and the hard material particles include ceramic particles comprising silicon carbon (SiC), silicon nitride ($Si_3N_4$), boron carbide (BC), cubic boron nitride (BN); and/or fluorides, including sodium fluoride (NaF), aluminium fluoride ($AlF_3$) and/or layered silicates, including kaolin, mica, wollastonite, talc, silica; and/or metallic fine powders, and the metallic fine powders include bronze and bismuth, and/or pigments or mixed phase oxide pigments, including cobalt aluminate (Co—Al), chrome antimony titanium (Cr—Sb—Ti), cobalt titanate (Co—Ti), iron alumina (Fe—Al), manganese ferrite (Mn—Fe) or cobalt chromite (Co—Cr).

17. The PTFE polymer-based sliding material according to claim 1, characterised in that the PTFE polymer-base is in a range of 50-95% by volume of the PTFE polymer-based sliding material.

18. A plain bearing composite material having a metallic support layer, including steel or bronze; having a porous backing layer, including bronze; and having the PTFE polymer-based sliding material according to claim 2 filling pores of the porous backing layer.

* * * * *